July 9, 1957 T. F. GOSSARD 2,798,954

TUNING DEVICE

Filed March 9, 1953 4 Sheets-Sheet 1

INVENTOR.
THOMAS FISCHER GOSSARD

BY [signature]

ATTORNEYS

July 9, 1957 T. F. GOSSARD 2,798,954

TUNING DEVICE

Filed March 9, 1953 4 Sheets-Sheet 2

INVENTOR

THOMAS FISCHER GOSSARD

BY

Cartolick & Faber

ATTORNEYS

July 9, 1957 T. F. GOSSARD 2,798,954

TUNING DEVICE

Filed March 9, 1953 4 Sheets-Sheet 3

INVENTOR.
THOMAS FISCHER GOSSARD

BY Oberlin & Limbach

ATTORNEYS

July 9, 1957 T. F. GOSSARD 2,798,954

TUNING DEVICE

Filed March 9, 1953 4 Sheets-Sheet 4

INVENTOR.
THOMAS FISCHER GOSSARD

BY Ostrolenk & Faber

ATTORNEYS

United States Patent Office 2,798,954

Patented July 9, 1957

2,798,954

TUNING DEVICE

Thomas Fisher Gossard, North Hollywood, Calif., assignor to Standard Coil Products Co., Inc., Los Angeles, Calif.

Application March 9, 1953, Serial No. 341,071

8 Claims. (Cl. 250—40)

My present invention relates to a tuning device for television receivers and more particularly it relates to a tuning device adapted to receive both ultra-high frequency and very high frequency signals.

Up to the present time only tuners for very high frequency were used in television receivers since only the wave band from 44 to 88 megacycles and from 174 to 216 megacycles had been assigned for television broadcasting. But recently it was decided to assign also an ultra-high frequency band (approximately from 500 to 900 megacycles) to television broadcasting.

One of the main problems brought up by this decision was to devise means for adapting presently used tuners to reception of ultra-high frequency signals, the means being such that the change of existing tuners to ultra-high frequency operation entailed the minimum amount of work.

This problem is overcome by my present invention which is essentially an adaptation of the very high frequency tuner described in Patent No. 2,496,183 to ultra-high frequency reception.

The very high frequency tuner described in the above patent consists of a turret containing coils which are successively coupled into the electronic circuits comprising the tuner proper. These coils are mounted on replaceable panels on the drum of the tuner.

The use of similar coils for the reception of ultra-high frequency signals is impractical since at those frequencies the radio frequency amplifier incorporated in the tuner and designed to amplify very high frequency signals is incapable of efficient amplification at ultra-high frequencies.

More complicated circuits would have to be used instead of the coils but this presents considerable mechanical and physical problems since the replaceable panels are of relatively small dimensions and the dimensions of the very high frequency and the ultra-high frequency panels must be the same if they are made to be interchangeable. The interchangeability is particularly important since the present tuner has provision for very high frequency channels which are rarely used, and the panels for those very high frequency channels can be substituted with panels for ultra-high frequency channels having circuits for reception of ultra-high frequency signals.

One of the major problems involved is that all components of the ultra-high frequency circuits must be mounted on the panels while in very high frequency operation each panel supports only a number of coils.

Another difficulty arises from the fact that the local oscillator is designed for very high frequencies and cannot be made to oscillate at frequencies higher than 300 megacycles by merely reducing the inductance of the oscillator coil. In fact, if an ultra-high frequency signal of 530.25 megacycles frequency had to be converted in the usual way to the intermediate frequency of 25.75 megacycles, the oscillator would have to oscillate at a frequency of 530.25+25.75, that is at a frequency of 556 megacycles which is considerably higher than the maximum very high frequency, 300 megacycles. At these ultra-high frequencies special tubes and special techniques would have to be used with considerable increase in cost of materials and of labor.

In other words, even if the R. F. amplifier were able to operate at ultra-high frequency, the very high frequency oscillator cannot produce a signal having a frequency that permits conversion of frequencies much higher than the very high frequency now used, without changes in the tuner proper and it is desired to effect the adaptation to ultra-high frequency reception while conferring all changes to the replaceable panels.

There are two practicable methods for converting the ultra-high frequency signals to intermediate frequency signals, that is signals having as carrier the intermediate frequency of the television set which is also the output frequency of the tuner. In most television receivers, the intermediate frequency is of the order of 21 to 25 megacycles; some tuners, however, use an intermediate frequency of approximately 40 megacycles. In my novel invention, therefore, I shall use, by way of example, an intermediate frequency of 25.75 megacycles as video carrier.

One method for converting the ultra-high frequency signals to intermediate frequency signals is obtained by converting directly the ultra-high frequency signals (500 to 900 megacycles) to 25.75 megacycles in the antenna circuit or in the circuit preceding the grid of the first R. F. amplifier tube, resulting in the use of the R. F. stage as a 25.75 megacycle amplifier. This also means that the converter stage becomes a 25.75 megacycle amplifier since no further conversion is needed. The addition of two stages, therefore, of 25.75 megacycle amplifiers coupled into the normal 25.75 megacycle intermediate frequency amplifier of the television set brings up feed back and regeneration problems which are quite difficult to overcome.

The second method which overcomes the above difficulties and is used in my novel tuning device is the double conversion system in which a harmonic of the local oscillator is used to convert the ultra-high frequency signal to a lower frequency from now on referred to as first-intermediate-frequency.

This first-intermediate-frequency is in the very high frequency band and when fed into the grid of the R. F. amplifier of the tuner is amplified as would be a normal very high frequency. This first-intermediate-frequency upon reaching the grid of the converter tube is again converted, this time by the fundamental of the local oscillator, to the second intermediate frequency (in this example 25.75 megacycles). The use of double conversion with a single oscillator requires that the desired harmonic of the oscillator which mixes with the incoming ultra-high frequency signal be below the signal frequency; more specifically, the normal inversion of the video and sound carriers accomplished in a tuner must not be done twice. When using double conversion, therefore, the desired harmonic of the oscillator must be below the signal frequency so that a double inversion does not take place.

Another factor concerning double conversion is that once the order of the harmonic has been determined, the first-intermediate-frequency is also determined for a given second intermediate frequency. For example, for a particular ultra-high frequency of 530.25 megacycles video carrier, the oscillator fundamental frequency will be 185.3 megacycles making the second harmonic approximately 370.6 megacycles. The 370.6 megacycle harmonic mixes with the 530.25 megacycle video carrier to produce 159.7 megacycles below the fundamental of the oscillator. Therefore, there is a fixed relation between the oscillator frequency, the first-intermediate-frequency and the signal or ultra-high frequency.

Accordingly, one of the objects of my present invention is the provision of an electrical circuit for converting ultra-high frequency signals to the intermediate frequency of a television receiver.

Another object of my present invention is the provision of means whereby very high frequency tuners can be converted easily to receive also ultra-high frequency signals.

A further object of my present invention is the provision of means whereby an ultra-high frequency signal is converted twice before being fed to the first-intermediate-frequency amplifier of the television receiver.

Another object of my present invention is the provision of means whereby similar replaceable panels can be used for mounting both the very high frequency coils and the ultra-high frequency circuits.

The plastic base of the replaceable panels of my present invention is essentially similar to that described in the above-numbered patent.

For ultra-high frequency on one of these bases is mounted a metallic frame having an R. F. pre-selector circuit, a harmonic selector circuit, a converter circuit, and a tuned circuit at the first intermediate frequency and on another, mounted on an insulating cylinder, the three coils for the plate circuit of the R. F. amplifier, for the grid circuit of the convertor and the plate circuit of the local oscillator and the harmonic generator circuit.

For very high frequency, on the other hand, on one of these bases are mounted by means of an insulating cylinder the antenna input coils of the R. F. amplifier and on another, also through an insulating cylinder, the coils for the plate circuit of the R. F. amplifier, for the grid circuit of the convertor, and the tuned circuit of the local oscillator. For ultra-high frequency operation the circuits mounted on the two panels are electrically connected to permit a harmonic of the oscillator frequency to be fed into the harmonic selector circuit and thus perform the first frequency conversion.

In the ultra-high frequency circuits the coils of the R. F. pre-selector and of the harmonic selector are each in parallel with variable capacitors which serve to permit precise tuning for each channel. These capacitances are obtained by painting and firing a silver tab on a ceramic cylinder around which is wound the coil. A screw mounted in a tapped hole in the metallic frame which is at ground potential and movable with respect to the ceramic cylinder constitutes one side of one of these capacitances, the other side being the silver tab. It is evident that the capacitance of these capacitors will be varied when the screw is moved with respect to the ceramic cylinder, thus providing a variable electrical element for exactly aligning these circuits.

Accordingly, another object of my invention is the provision of means whereby ultra-high frequency circuits of relative complexity can be mounted very compactly occupying practically the same space as the coils of the very high frequency circuits.

A further object of my present invention is a variable capacitance forming an integral portion of a coil structure.

The replaceable very high frequency and ultra-high frequency panels are supported by a drum consisting of three discs with appropriate slots engaged by corresponding extensions at the panel's ends. Two springs with finger-like extensions are made integral with the two external discs to retain in place the panels. The central disc of diameter greater than the two lateral disc is provided on its periphery with indentations which in cooperation with a roller and detent spring secured to the tuner's chassis serve as positioning means, that is to position the drum, so that a plurality of contact buttons extending outwardly from the panels and to which the circuits mounted on the panels are connected may be in exact contact with a series of kidney spring contacts on an insulator secured to the tuner's chassis.

The drum is secured to a shaft which can rotate in approximately V-shaped bearings cut into the chassis of the tuner. At one end of the chassis, more precisely at the front end of the chassis, is located a fine tuning device consisting of a variable capacitance, the capacity variation being obtained by movement of the position with respect to the plates. The dielectric is mounted on a cylinder which is freely rotatable around the extending portion of the main shaft. The end of the main shaft is provided with an appropriate conformation to receive an appropriately shaped operating handle. The drum is secured to the chassis by means of two wire springs which serve not only to retain the drum in its correct position inside the chassis but also to bias the drum so that its extending contacts may make good electrical contact with the stationary kidney spring contacts.

Accordingly, another object of my present invention is means whereby the rotatable drum of the tuner can be exactly positioned with respect to a plurality of stationary contacts.

Another object of my present invention is the provision of means for releasably securing the rotatable drum of a tuner to its chassis.

A further object of my present invention is the provision of means whereby fine tuning is obtained by means of a variable capacitance, the variation in capacitance being caused by a variation in the dielectric engaged by the plates of this capacitance.

All the electrical components of the antenna segment and of the oscillator-converter segment are mounted on the insulating panels in such a position that their connecting leads are as short as possible, that there are no cross-over of leads, and so that the correct type of coupling is obtained among the various circuits. It is also seen that by arranging the movable electrical contacts on the panels mounted on the drum so that they engage stationary contacts as the drum is axially rotated, the current path from the electrical circuits mounted on the panels to the electrical circuits mounted on the chassis is very short, decreasing considerably stray capacitance and stray inductance between leads and stray capacitance between leads and ground, thus making the tuner more apt to operate at ultra-high frequencies.

Accordingly, another object of my invention is the provision of means whereby stray capacitance and stray inductance in a tuner are considerably reduced, thus making its use at ultra-high frequency more efficient.

From the above it is now clear that in my present invention while the electrical circuits mounted on the panels are of one kind for ultra-high frequency and of another kind for very high frequency, all the other electrical components of my tuning device are mounted on the chassis and are the same whether the panels engaged by the stationary contacts are ultra-high frequency or very high frequency.

In other words, if it is desired to make my tuning device receive an ultra-high frequency station, it is only necessary to replace a set of unused very high frequency panels with the proper set of ultra-high frequency panels without making any changes in those parts of the tuner circuit that are mounted directly on the chassis.

Accordingly, another object of my present invention is the provision of means whereby ultra-high frequency panels and very high frequency panels can be successively engaged by the stationary contacts to permit reception of ultra-high frequency signals or very high frequency signals, respectively.

The foregoing and many other objects of my invention will become apparent when taken in connection with the following description and drawings in which.

Figures 2, 16, 17, 18:
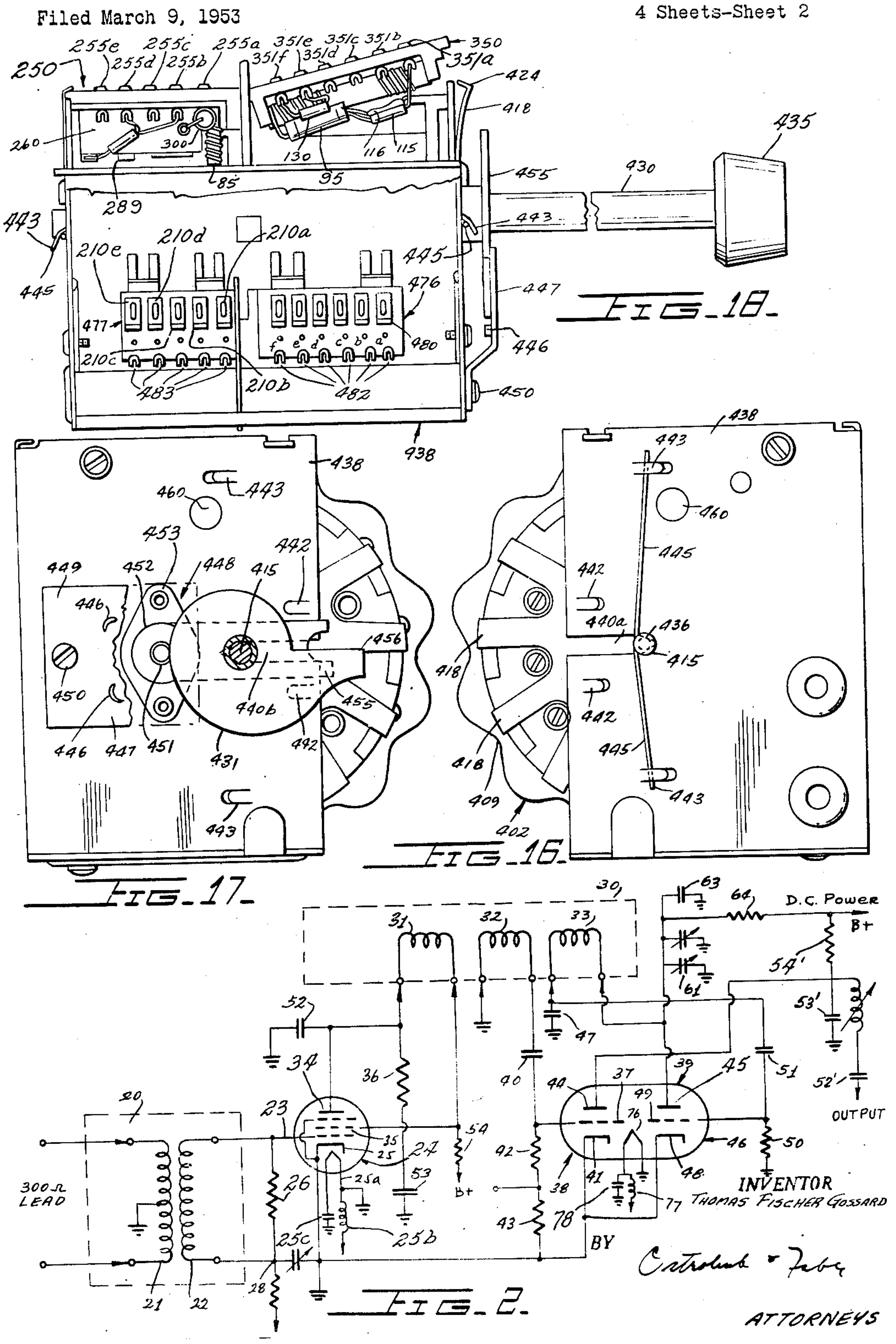
Figure 2 is a schematic diagram of the very high frequency tuner to which the ultra-high frequency segments of my invention can be connected for ultra-high frequency reception.
Figure 16 is a back view of the complete tuner with chassis incorporating my invention.
Figure 17 is a front view of the complete tuner with chassis incorporating my invention.
Figure 18 is another sectional view of the drum incorporating my invention showing how the ultra-high frequency panels are mounted thereon.

Referring to Figure 2 showing the schematic diagram of the very high frequency coil strips of my invention, the antenna coil segment 20 contains two coils 21 and 22. The first coil 21 has the center connected to ground and is connected to the 300 ohm antenna lead-in. The other coil 22 is connected instead to the grid 23 of the radio frequency amplifier tube 24.

Between grid 23 and cathode 25 of tube 24 is connected a circuit consisting of a resistance 26 and a capacitance 27. The point 28 at which resistance 26 is connected to capacitance 27 constitutes the tap to which, by means of resistance 29, is received the voltage to be used for automatic gain control. The circuit for automatic gain control is not shown in these drawings since it is a circuit well-known in the art.

The converter oscillator coil segment 30 consists of three coils 31, 32, 33. Coil 31 is connected between the plate 34 and the screen grid 35 of the R. F. amplifier tube 24 and is shunted by a resistance 36. Plate 34 of tube 24 is also connected to ground through adjustable trimmer capacitance 52 while screen grid 35 is connected to ground through capacitance 53. Plate 34 is connected to the D. C. power supply (not shown) through low resistance coil 31 and resistance 54, while screen grid 35 is connected to the same power supply through resistance 54.

Filament **25*a* of tube 24 is connected on one side to ground and on the other to the filament transformer (not shown) through a filter circuit consisting of series inductance 25*b* and capacitance 25*c* connected on one side between filament 25*a* and inductance 25*b*** and on the other to ground.

Coil 32 is grounded on one side and on the other side is connected to the grid 37 of the converter section 38 of the double triode 39 through a capacitance 40. Grid 37 of converter triode 38 is connected to cathode 41 of tube 38 and to ground through two resistances in series, 42 and 43. The grid 37 is also connected to ground through trimmer capacitor 40'. The plate 44 of converter tube 38 is connected to the intermediate frequency coil 51 of the tuner mounted on the chassis of the tuner. The D. C. power for plate 44 of triode section 38 is supplied through resistor 54' by a power supply indicated at 64'. Coil 51' is tuned to the intermediate frequency through the capacitor 53' and the output from my tuning device is passed to the next stages through coupling capacitor 52'.

Coil 33 is connected on one side to the plate 45 of oscillator section 46 of double triode 39 and on the other to ground through a capacitance 47. Cathode 48 of oscillator tube 46 is connected to ground, while grid 49 is connected to ground through resistance 50 and to the upper plate of capacitance 47 through capacitance 51.

Plate 45 of oscillator section 46 is connected to ground through two variable capacitances 61 and 62, of which 62 is the tuner fine tuning capacitance. Plate 45 is connected to the D. C. power supply 64' through resistance 64.

Filament 76 of tube 39 is connected on one side to ground and on the other to the filament transformer (not shown) through a filter circuit consisting of series inductance 77 and capacitance 78 connected on one side to filament 76 and on the other to ground.

It is here deemed necessary to point out that only antenna coil segment 20 and oscillator converter segment 30 are rotatably mounted, as hereinafter described, with respect to the chassis of the tuner, the other components of the circuit shown in Figure 2 being fixedly mounted on the chassis itself.

Figure 1:
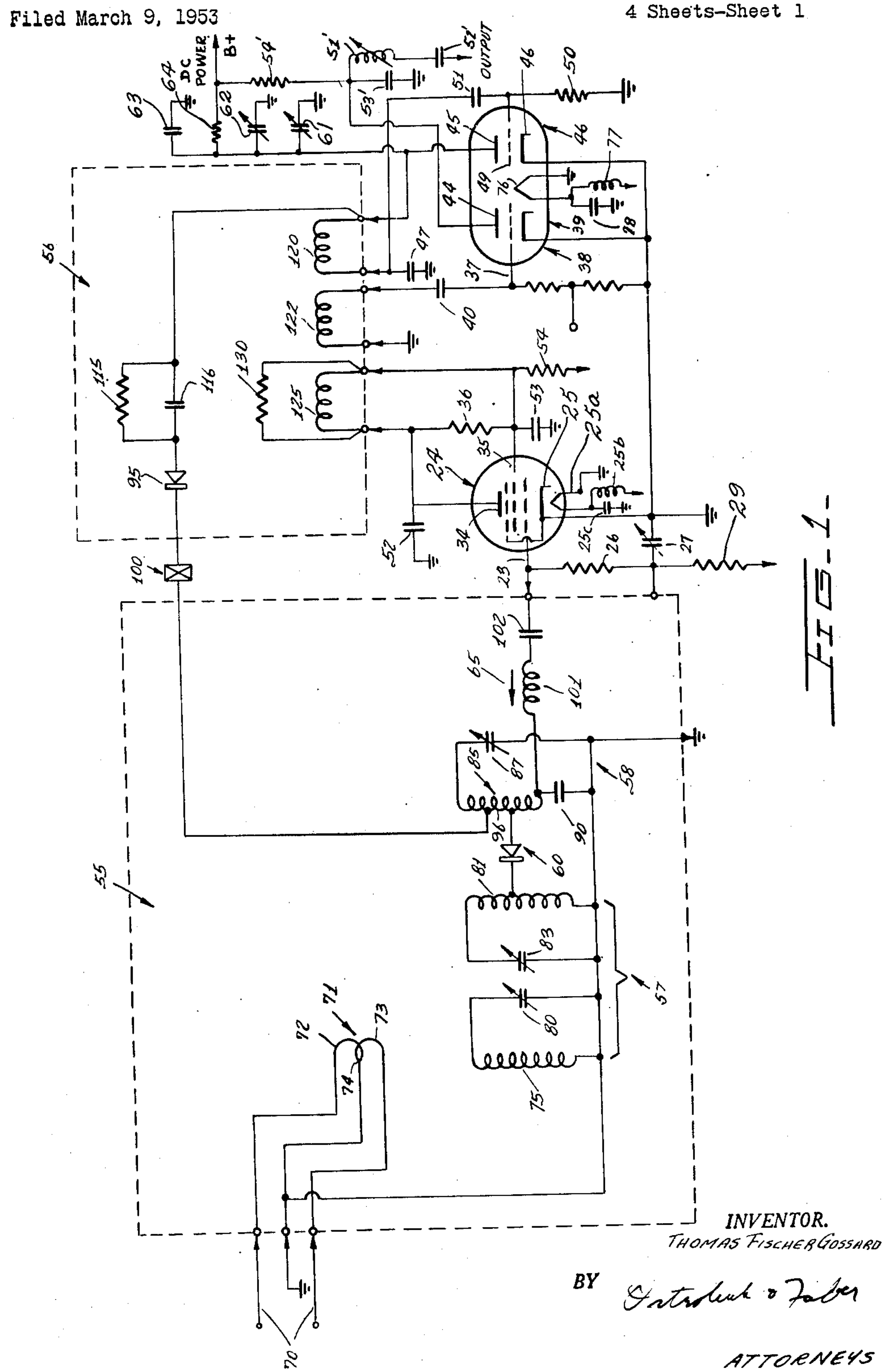
Figure 1 is a schematic diagram of the ultra-high frequency tuner of my invention.

Referring now to Figure 1 showing the schematic diagram of the ultra-high frequency coil strips, the panels used for reception of ultra-high frequency signals are hereinafter referred to as antenna segment 55 and oscillator converter segment 56. The antenna segment 55 consists essentially of a radio frequency pre-selector 57, of a harmonic selector 58, a crystal mixer 60 and a tuned circuit 65 of the first-intermediate-frequency amplifier which corresponds to the radio frequency amplifier 24 abovementioned in connection with the very high frequency coils.

More specifically, the 300 ohm antenna leads 70 are connected to the center tapped coil 71 consisting of two sections 72 and 73 having the center 74 connected to ground. Coil 71 is mutually coupled to the inductance 75 of the radio frequency pre-selector 57. Inductance 75 is tuned by means of variable capacitor 80 connected on one side to inductance 75 and on the other to ground, inductance 75 being also connected to ground. This first tuned circuit consisting of inductance 75 and capacitance 80 of the radio frequency pre-selector circuit 57 is mutually coupled to another practically identical tuned circuit consisting of inductance 81 and variable capacitance 83. One side of inductance 81 is connected to one side of capacitance 83, the other side of inductance 81 and capacitance 83 being connected to ground.

Both parallel circuits 75—80 and 81—83 of pre-selector 57 are tuned, of course, to the ultra-high frequency signal, in this example, 530.25 megacycles.

The coupling between tuned circuits consisting of inductance 75 and capacitance 80 and the circuit consisting of inductance 81 and capacitance 83 is a complex type of coupling and consists of a combination of inductive, capacitive and common path coupling but results in a circuit having sufficient band width and selectivity at the ultra-high frequency used (500 to 900 megacycles).

Crystal mixer 60 is connected directly to inductance 81 through a tap located approximately one turn of inductance 81 above ground. The location of this tap is to provide the correct impedance for matching the crystal mixer 60 at the ultra-high frequency signal.

Crystal mixer 60 is connected on the other side to inductance 85 of harmonic selector 58. More specifically, crystal mixer 60 is connected approximately one turn above the point where coil 85 is connected to capacitor 90. The other side of inductance 85 is connected to variable capacitance 87. Capacitance 90 and capacitance 87 are connected on the other side to ground.

Inductance 85, variable capacitance 87 and capacitance 90 constitute the tuned circuit for the desired higher harmonic of the local oscillator. In a modified form of mixer circuit, the mixer crystal 60 instead of being tapped to coil 85 returns to ground through a single turn coupling loop and a capacitance corresponding to 90. In this embodiment coil 85 returns directly to ground instead of through capacitance 90. This tends to reduce regeneration and provides better control of coupling.

Harmonic selector circuit 58 selects the voltage of the higher harmonic that is fed to it by the harmonic generator crystal 95 coupled into the crystal mixer 60 through portion 96 of inductance 85. More specifically, harmonic generator crystal 95 is connected by means of a tap approximately one turn above the point at which the crystal mixer 60 is connected to inductance 85. Harmonic generator 95 is connected to inductance 85 by means of a connecting rod 100 which extends from the oscillator convertor segment 56 into the antenna segment 55. In a further embodiment I have found that the harmonic generator 95 and resistor 115 may be dispensed with.

The first-intermediate-frequency load for the crystal mixer 60 consists of capacitance 90 which together with inductance 101, capacitance 102, input admittance of the radio frequency amplifier tube 24 comprises the series tuned or low pass network 65 at the first-intermediate-frequency.

More specifically, inductance 101 is connected to the point at which capacitor 90 is connected to inductance 85. The other side of inductance 101 is connected to the control grid 23 of the radio frequency amplifier tube 24 through capacitance 192. Between grid 23 and cathode 25 of tube 24 is connected a circuit consisting of resistance 26 and variable capacitance 27. The point 28 at which resistance 26 is connected to capacitance 27 constitutes the tap to which by means of resistance 29 is received the voltage used for automatic gain control is not shown in these drawings since it is a circuit well-known in the art.

To summarize the above, harmonic selector circuit 58 consisting of inductance 85, capacitance 87 and capacitance 90 is tuned to the desired harmonic of the local oscillator which, in the case of the second harmonic, is 370.67 megacycles; while band pass circuit 65 consisting of capacitance 90, inductance 101 and the input capacity of R. F. amplifier tube 24 is series tuned to the first-intermediate-frequency which in this example would be 159.58 megacycles.

The oscillator convertor segment 56 for ultra-high frequency consists, as previously mentioned, of a harmonic generator 95 connected on one side to connector 100 and on the other to a resistance capacitance parallel circuit consisting of resistance 115 and capacitance 116. Resistance 115 and capacitor 116 constitute a coupling network for connecting the harmonic generator crystal 95 to the oscillator coil 120. In addition to oscillator coil 120 there are two other coils in the oscillator convertor segment 56. These coils are the convertor grid coil 122 and the radio frequency plate coil 125. Coil 125 is connected between the plate 34 and the screen grid 35 of radio frequency tube 24. Plate 34 and screen grid 35 of tube 24 are also shunted by a resistance 36 (not part of the oscillator convertor segment but part of the tuner proper). Coil 125 is also shunted by a second resistance 130 which, on the other hand, does belong to the oscillator convertor segment 56. Resistance 130 provides additional loading of the R. F. amplifier 24 to offset some regenerative feed-back introduced by connector 100 between the antenna segment 55 and the oscillator-convertor segment 56.

Convertor grid coil 122 is connected on one side to ground, on the other side through coupling capacitor 40 to the grid 37 of the convertor section 38 of the double triode tube 39 used in this particular embodiment.

Grid 37 is connected to ground through two resistances in series, 42 and 43 and trimmer capacitor 40'. Coupling capacitor 40, resistances 42, 43, tube 39 belong to the tuner proper and not to the oscillator convertor section. Plate 44 of section 38 of tube 39 is connected to the second-intermediate-frequency coil 51' and capacitor 53' and at this point the frequency of the carrier will be (for the present embodiment) 25.75 megacycles video carrier.

Coil 120 is connected on one side to the plate 45 of the second or oscillator triode section 46 of double triode 39. The same side of inductance 120 is connected to the previously mentioned R. C. coupling circuit consisting of resistance 115 and capacitance 116; the other side is connected to ground through capacitance 47 and to grid through capacitance 51 and the grid 49 is connected to ground through resistor 50. Cathode 48 of section 46 and cathode 41 of section 38 are connected together and to ground grid 49 of triode section 46 is connected to ground through resistance 50 and to the other side of capacitance 47 through a capacitance 51.

I have limited my description to that portion of the tuner that is directly related to the antenna segments and oscillator convertor segments of my invention, the other parts of the tuner being all well-known in the art.

The operation of the oscillator convertor section 56 of the tuner at ultra-high frequency is practically identical with its operation at very high frequency. It is important at this point to point out that for every different ultra-high frequency there will be a different first-intermediate-frequency, while the second-intermediate-frequency is the same for every different ultra-high frequency or very high frequency.

Using double conversion, i. e., a first conversion from ultra-high frequency and then from very high frequency to the intermediate frequency, in this case 25.75 megacycles, the oscillator frequency is of such a value that its desired harmonic (second in the present example) will be below the ultra-high frequency by such an amount as to produce the first-intermediate-frequency and at the same time the fundamental of the local oscillator must be above the first-intermediate-frequency by such an amount as to produce the second intermediate frequency.

This means that for every different ultra-high frequency signal there will be a different frequency from the local oscillator as well as a different first-intermediate-frequency.

More specifically, if we denote by S the frequency of the ultra-high frequency signal in megacycles, and by $IF_1$ the first-intermediate-frequency and by $nF$ the frequency of the desired harmonic of the local oscillator where $n$ is the order of the harmonic, by F the fundamental frequency of the local oscillator, by $IF_2$ the second-intermediate-frequency, we can write the following relations between the above-mentioned frequencies:

$$IF_1=\frac{S-nIF_2}{(n1)} \qquad (1)$$

$$F=\frac{(SIF_2)}{n1} \qquad (2)$$

For example, for a 530.25 megacycle signal video carrier using Equations 1 and 2, it is found that the fundamental frequency of the oscillator is 185.3 megacycles from which it is seen that the second harmonic would be 370.7 megacycles. The 370.7 megacycle frequency mixes with 530.25 megacycles signal to produce a video carrier of first-intermediatae-frequency 159.6 megacycles where the first-intermediate-frequency of 159.6 megacycles is found by use of Equation 1.

The first-intermediate-frequency signal at a frequency of 159.6 megacycles mixes in turn with the fundamental of the local oscillator 185.3 to produce the tuner output second-intermediate-frequency 25.75 megacycle video carrier frequency.

The harmonic selector circuit 58 which consists of inductance 85 and capacitance 87 serves to build up the voltage of the harmonic generated by the harmonic generator crystal 95. But this power, thus available at this harmonic frequency, would be insufficient to obtain optimum value of crystal current of the crystal mixer 60.

In my invention I connect the harmonic generator crystal 95 to the oscillator coil 120 which is at a D. C. potential of approximately 100 volts. The harmonic generator 95 is not connected directly to inductance 120 and, therefore, the D. C. potential of 100 volts but through the RC coupling circuit consisting of resistance 115 of approximately 100,000 to 200,000 ohms and a capacitance 116. Resistance 115 being fairly high resistance limits the current through the crystal 95 to approximately one-half to one milliamp.

As previously mentioned, crystal mixer 60 is connected in series to harmonic generator crystal 95 through connector 100 and a portion 96 of inductance 85 as far as direct current is concerned. The direct current path would then go from the oscillator coil 120 through resistance 115, harmonic generator crystal 95, portion 96 of the harmonic selector inductance 85, through the mixer crystal 60 and a portion of inductance 85 to the second section of radio frequency pre-selector 57 and from there to ground.

It is now important to point out that aside from segments 55 and 56 (enclosed by dotted lines in Figure 1), the remaining portion of the electrical circuit mounted on the chassis of the tuner is exactly the same as that described in connection with Figure 2.

Figure 3:
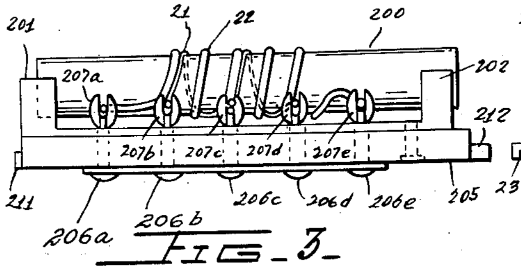
Figure 3 is a front view of an antenna coil segment used in very high frequency tuners.

Referring to Figure 3 showing the structure of the antenna segment 20 (Figure 2) for very high frequency signals, both coils 21 and 22 are wound on an insulating cylinder 200 which is mounted on supporting arms 201 and 202 of insulating panel 205. Panel 205 is provided with five electrical contacts 206 (*a–e*) having extensions 207 (*a–e*) to which the coils 21 and 22 can be soldered. Secondary coil 22 is connected to the outer contacts **206*a* and end 206*e*, while primary coil 21 is connected to the contacts 206*b* and 206*d*. The center of coil 21 is connected to the center contact 206*c***.

Figure 13:
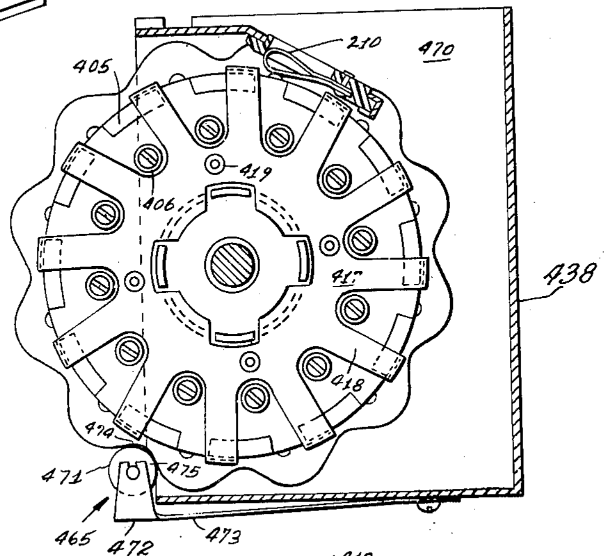
Figure 13 is a sectional view of the complete tuner with chassis incorporating my invention.

The corresponding stationary contacts 210 (see Figure 13) hereinafter referred to in more detail are connected to electrical circuits so that when contacts 206 come into engagement with stationary contacts 210, contacts **206*a* and 206*e* are connected to the 300 ohm antenna lead, contacts 206*b* and 206*d* to the input resistors 26 of the R. F. amplifier and contact 206*c*** to ground, thus completing the circuit shown in Figure 2.

Panel 205 is also provided with spaced teeth 211 at one end and large tooth 212 at its other end by means of which panel 205 can be mounted on the supporting elements hereinafter described.

Figure 4:
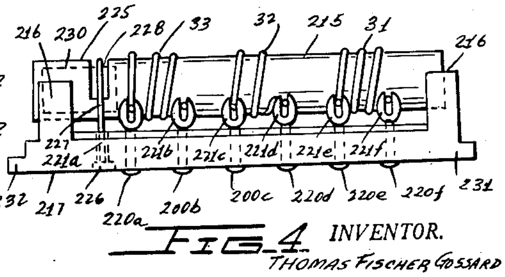
Figure 4 is a front view of an oscillator converter coil segment used in very high frequency tuners.

Referring now to Figure 4 showing the structure of the oscillator convertor segment 20 for very high frequency signals, coils 31, 32 and 33 (see Figure 2) are wound on an insulating cylinder 215 mounted on supporting arms 216 of insulating panel 217. Panel 217 is provided with electrical contacts 220 (*a–f*) having extensions 221 (*a–f*) to which the terminals of coils 31, 32, and 33 are soldered. Oscillator coil 33 is connected to contacts 220 and **220*b*, convertor grid coil 32 to contacts 220*c* and 220*d*. R. F. amplifier plate coil 31 is connected to contacts 220*e* and 220*f***.

The corresponding stationary contacts (not shown) are connected to electrical circuits so that when contacts 220 (*a–f*) come into engagement with their stationary contacts, contacts **220*a* and 220*b* are connected, respectively, to the plate 45 of the oscillator section 46 of the double triode 39 and to ground through capacitance 47** as well as to the other circuit elements illustrated in Figure 2.

Contacts **220*c* and 220*d* are connected, respectively, to the grid 37 of the convertor section 38 of the double triode 39 through capacitance 40 and to ground; contacts 220*e* and 220*f* are connected across the plate 34 and the screen grid 35 of the radio frequency amplifier 24. Insulating cylinder 215 is cut at the end 225 near which oscillator coil 33 is wound. Panel 217 is provided with an opening 226 through which is secured a wire spring 227 which engages the cut 228 in insulating cylinder 215**.

In the interior of cylinder 215 on the side where oscillator coil 33 is wound is placed metallic screw 230 whose threads are engaged by wire spring 227. Wire spring 227 then acts to position screw 230 with respect to the coil 33, that is, to provide easy adjustment of the oscillator's frequency.

Panel 217 is also provided with two spaced teeth 231 and one large tooth 232 by means of which panel 217 is mounted on the supporting elements hereinafter described.

Referring now to Figures 5, 6, 7 and 8 showing the structure of the antenna segment 55 for ultra-high frequency, the supporting panel 250 is similar in shape to panel 205 for the very high frequency coils, but it does not have supporting arms 201, 202.

Plastic panel 250 is provided with electrical contacts 255 (*a–e*) having extension 256 (*a–e*) to which are soldered the terminals of the circuit supported by panel 250 as hereinafter described.

A metallic sub-chassis or ground plate 260 having the shape of an angle section is supported on one side by means of a metal tab 261 kicked out of the metallic chassis 260 itself and soldered to the center extension **256*c* of the contact 255*c* mounted on the panel 250**.

The other side of ground plate 260 has two metallic fingers 265 and 266 protruding from the edge 267 of the ground plate 260. Metallic extensions 265 and 266 are bent over into appropriate slots 268 and 269 formed into the material (plastic) forming the antenna segment panel 250.

The two inductances 75 and 81 of the radio frequency pre-selector 57 are mounted on ceramic cylinders 270 and 271, respectively. On one end of each of these ceramic cylinders 270 and 271 is a silver tab 275 painted and baked on the ceramic cylinders 270 and 271 and to which is connected one end of inductance 75 and 81. The other ends 272 and 273 of these inductances 75 and 81 are connected to ground, i. e., to the grounding plate 260.

The tuning capacity 80 for inductances 75 and 83 for inductance 81 consists of the capacity between the silver tab 275 on the ceramic tube 270 or 271 and screw 280 which is threaded into the metal sub-chassis 260 on antenna segment panel 250. The capacity 80 or 83 of the tuned circuits is, therefore, available by moving screw 280 in and out of the threaded wall 281 in the metal sub-chassis 260.

This variation of capacitance can give a frequency range for the radio frequency pre-selector 57 of approximately 30 to 40 megacycles, thus making possible the use of a single design of coils 75 or 81 for five or six different ultra-high frequency channels. After coils 75 and 81 have been wound on the ceramic cylinders 270 and 271, respectively, and soldered in place to the silver tabs 275, each of the complete units is dipped in a plastic cement so that the inside surface 285 of the ceramic tube 270 or 271 is covered with a smooth plastic film. This film prevents screws 280 from coming in direct contact with the ceramic material forming the tabs 270 and 271. This ceramic material has a high dielectric constant and if screws 280 come into contact with the ceramic material directly, they would cause very erratic tuning as screws 280 are moved in and out to tune to the correct frequency.

To firmly secure screws 280 in their position with respect to silver tabs 275, heads 286 of screws 280 are biased by means of a wire spring 287 so that screws 280 bear firmly against the threaded wall 281 of metal sub-chassis 260, providing positive electrical connection between the threaded wall 281 of sub-chassis 260 and the screws 280. Wire spring 287 is placed between the plate 260 and insulating panel 256 and in such position that screws 280 are biased in opposite directions.

On ceramic cylinder 270 is also wound the antenna coil 71 whose terminals 288 are connected to extensions **265*b* and 256*d* of contacts 255*b* and 255*d*, respectively. The leads 288 connecting coil 71 to extensions 256 of contacts 255 are covered by a spaghetti insulation 289 so that leads 288 do not make electrical contact with grounding plate 260. Mid-point of coil 71 is connected to ground, i. e., to grounding plate 260**.

Figure 5:
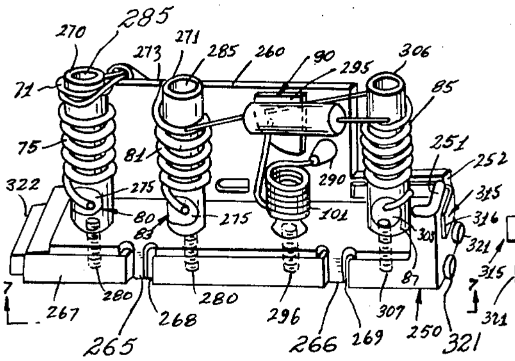
Figure 5 is a front view of the ultra-high frequency antenna segment of my invention.
Figure 6:
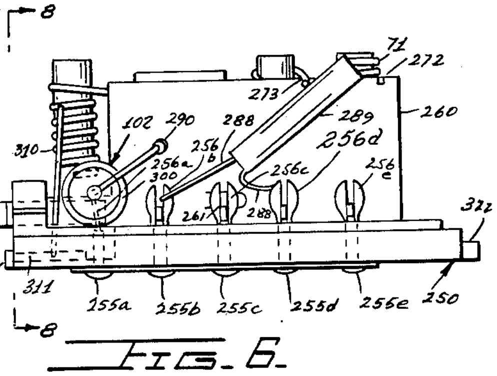
Figure 6 is a back view of the ultra-high frequency antenna segment of my invention.
Figure 7:
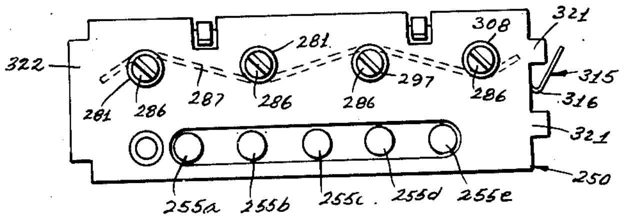
Figure 7 is a bottom view of the ultra-high frequency antenna segment of my invention.

Looking, therefore, at the antenna coil segment 55 as shown in Figure 5, from the left are mounted: the ceramic cylinder 270 with coils 71 and 75. Coil 75 has its top terminal connected to the ground plate or sub-chassis 260. The other terminal of inductance 75 is soldered to silver tab 275 which is one side of capacitor 80, the other side of capacitor 80 being screw 280 whose threads engage appropriate threads in opening 281 of sub-chassis 260.

Going toward the right, the next coil is coil 81 also mounted on a ceramic tube 271. The top terminal of coil 81 is connected to the grounding plate 260 while its lower terminal is connected to another silver tab 275 which is one side of capacitor 83, the other side of capacitor 83 being another screw 280 engaging another threaded portion 281 of metal sub-chassis 260.

Both tuned circuits 75, 80 and 81, 83 are tuned to the same frequency, i. e., the signal frequency. Next to coil 81 is the enamelled wire coil 101 in the input circuit of the radio frequency amplifier tube 24. Coil 101 is tuned to the first-intermediate-frequency. It consists of a copper wire with enamel coating and is self-supporting. One end of coil 101 is soldered to one side of capacitor 90 located above and back of coil 101. The other terminal of coil 101 goes through an opening 290 in the ground plate 260 and is connected to a second ceramic disc capacitor 102 (see Figure 6) located in the other side of metal plate 260.

Capacitance 90 consists of a dielectric disc 295 having its surfaces silvered which by means of solder is secured to grounding plate 260. As previously mentioned, the other side of capacitance 90 is connected to one terminal of inductance 101. Industance 101 is supported by means of its own leads extending to electrical elements on the sub-chassis 260 and its inductance is varied by means of screw 296 which rides along the axis of the coil. Screw 296 also engages an appropriate threaded opening 297 in grounding plate 260.

The other terminal of inductance 101, as previously mentioned, is connected to one side of capacitance 102. Capacitance 102 consists of a dielectric disc 300 having its surfaces silvered. One of such surfaces is soldered to inductance 101, while the other is connected to extension **256*a* of contact 255*a*. Coil 85 is at the extreme right and it has its top terminal connected to the same plate or capacitance 90 to which is connected inductance 101**.

The bottom terminal of coil 85 is soldered to another silver tab 305 painted on the lower portion of ceramic tube 306 on which coil 85 is wound. Silver tab 305 is one plate of capacitance 87, the other plate of capacitance 87 being screw 307 which also engages an appropriate threaded opening 308 in metal sub-chassis 260.

A few turns below the top terminal of coil 85 is connected a conductor 310 which ends in the female portion 311 of connector 100. Female portion 311 of connector 100 actually consists of a semi-cylindrical conductor 310 and is placed in recess 253 of panel 250.

Ground connection 315 consisting of a resilient conducting leaf 316 is soldered to the right-hand end of metal sub-chassis 260. As will be seen later, spring 316 will bear against a grounded supporting element of a tuner. Between coil 81 and coil 85 is connected the ultra-high frequency crystal mixer 60. This ultra-high frequency diode is chosen because of its small physical size.

Panel 250 is also provided with two spaced teeth 321 and one large tooth 322 by means of which panel 250 is mounted on the supporting elements as hereinafter described.

Figure 9:
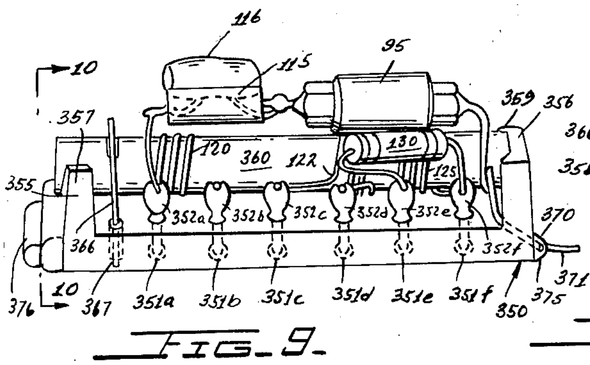
Figure 9 is a front view of the ultra-high frequency oscillator converter segment of my invention.
Figure 10:
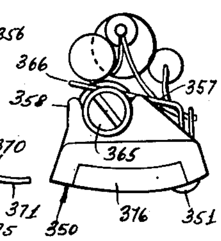
Figure 10 is a side view of the ultra-high frequency oscillator converter segment of my invention taken from line 10—10 of Figure 9 looking in the direction of the arrows.
Figure 8:
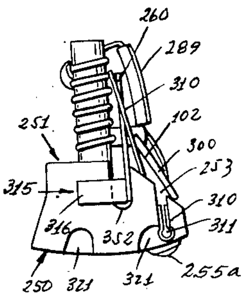
Figure 8 is a side view of the ultra-high frequency antenna segment of my invention taken from line 8—8 of Figure 6 looking in the direction of the arrows.

Referring now to Figures 9 and 10 showing the structure of the oscillator converter segment 56 for ultra-high frequency signals, plastic panel 350 is provided with six contacts 351 having extensions 352 to which are soldered the terminals of the electrical circuits supported by panel 350, hereinafter described.

Panel 350 is provided with two arms 355 and 356. Arm 355 is actually a U-shaped member having two extensions 357 and 358. Arm 356 instead has a semi-circular recess 359 so that an insulating cylinder 360 can be supported on panel 350 by means of arms 375—358 and recess 359 on arm 355 and arm 356, respectively.

Essentially, the insulating cylinder structure and the coils supported by this structure are similar to those described in connection with the very high frequency convertor segment. In fact, insulating cylinder 360 is wound with three coils 120, 122 and 125 in the drawing from left to right, respectively. Coil 120 is connected to extensions **352*a* and 352*b* of contacts 351*a* and 351*b*. Coil 122 is connected to extensions 352*c* and 352*d* of contacts 351*c* and 351*d*. Coil 125 is connected to extensions 352*e* and 352*f* of contacts 351*e* and 351*f***.

To make the inductance 120 of oscillator 46 variable within certain limits, a metallic screw 365 is introduced in the insulating cylinder 360 at the side where coil 120 is wound. To position screw 365, a wire spring 366 secured to panel 350 through opening 367 in panel 359 engages threads of screw 365 through opening 369 in insulating cylinder 360.

To extension **352*a* of contact 351*a* is also connected a circuit consisting of the parallel combination of resistance 115 and capacitance 116 in series with harmonic generator crystal 95. The other terminal of harmonic generator crystal 95 extends through an opening 370 at the right-hand end of panel 350 to form a protruding connecting extension 371 which is the male part of connector 100** shown in Figure 1.

Across coil 125 is connected resistance 130, i. e., resistance 130 is connected to extensions **352*e* and 352*f* of contacts 351*e* and 351*f*, respectively. Panel 350 is also provided with two spaced teeth 375 on one side of panel 350 and a large tooth 376 on the other side of panel 350 which serve as means for mechanically connecting panel 350** to its supporting structure hereinafter described.

Figure 11:
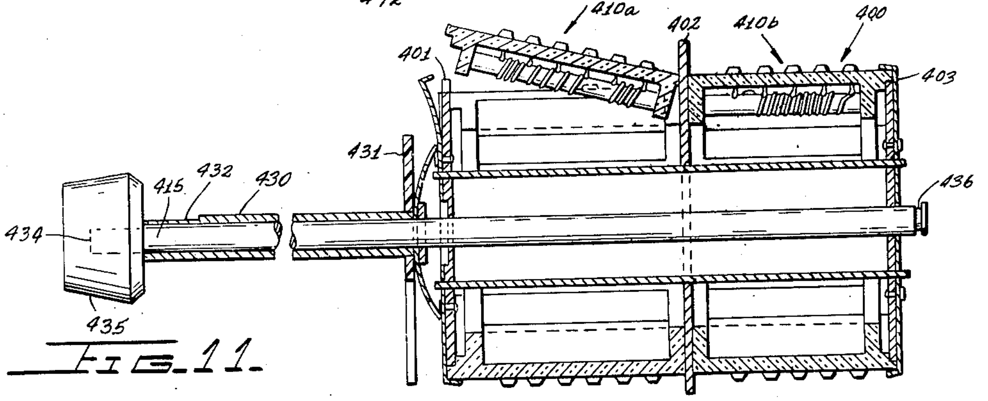
Figure 11 is a sectional view of the drum of the tuner of my invention showing how the very high frequency panels are mounted on the drum.

Referring to Figure 11 showing the drum 400 of the tuner of my invention, it will be seen that my novel tuner is a modification of the tuner described in Patent No. 2,496,183.

The drum 400 consists essentially of three supporting discs 401, 402, 403. Discs 401 and 403 are provided with slots 405 and circular openings 406, the number of slots 405 and circular openings 406 being equal to the number of channels used, in this case twelve.

Disc 402 (see also Figure 14) of larger diameter than discs 401 and 403 while provided with slots 407 also has indentations 409 located at its outer circumference and extending considerably beyond the surface produced by the structure consisting of the panels generally referred to as panels 410 but actually consisting of the previously described very high frequency panels 205 and 217 and ultra-high frequency panels 256 and 356. The three discs 401, 402 and 403 are secured to a shaft 415 with disc 402 placed between discs 401 and 403.

The outer discs 401 and 403 are provided with a spring member 417 (see also Figure 13) having a plurality of integral resilient fingers 418, the number of these resilient fingers being equal to the number of channels, in this example twelve. Springs 417 are secured to discs 401 and 403 by mearns of rivets 419.

Figure 14:
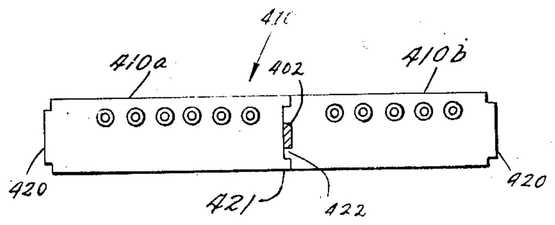
Figure 14 is a bottom view of the insulating panels used for mounting the very high frequency coils.
Figure 12:
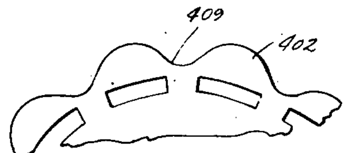
Figure 12 is an enlarged view of the positioning disc of my invention.

It is now evident that when panels 410 shown more in detail in Figure 14 are placed in slots 405 of discs 401 and 403 and in slots 407 of disc 402 so that their large teeth 420 engage slots 405 in discs 401 and 403 and the small spaced teeth 421 of panel 410*a* with small teeth 422 of panel 410*b* engage slots 407 in disc 402, drum 400 will be complete.

Figure 15:
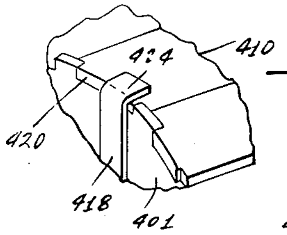
Figure 15 is a detailed view of the panel holding means used in my invention.

Spring fingers 418 which have a bent portion 424 (see Figure 15) will now keep panels 410 from moving away from discs 401 and 403. It is evident, on the other hand, that when panels 410 are to be removed from drum 400, it is only necessary to bend fingers 418 as shown in Figure 11 so that panels 410 may now be moved in a direction perpendicular to shaft 415 and pulled out of their position on drum 400.

Mounted on the same shaft 415 is a cylindrical sleeve 430 which carries at its end nearest to disc 401 a dielectric piece 431 secured to sleeve 430 so that rotation of sleeve 430 will produce a simultaneous rotation of dielectric 431. Sleeve 430 is also provided at its farthest end from disc 401 with an identation 432 through which an operating handle (not shown) can engage sleeve 430.

At the farthest end of shaft 415 is an indentation 434 which also permits engagement of shaft 415 by operating handle 435. The other end of shaft 415 is provided with a circular recess 436 which serves to secure drum 400 to chassis 438 of my novel tuner.

More specifically (see Figures 16 and 17), chassis 438 which is rectangular in shape is provided at its opposite end with recesses 440 having V-shaped ends through which shaft 415 of drum 400 is mounted on chassis 438. V-shaped recesses 440 are not of the same dimensions, one of them 440*a* being of smaller dimensions than the other 440*b*. V-recess 440*a* is engaged by the smaller diameter portion 436 of shaft 415, while V-shaped recess 440*b* is engaged by a regular portion of shaft 415.

On chassis 438 near each recess 440 and on each side of recesses 440 are two bent fingers 442 kicked out from metallic chassis 438. Further away from recesses 440 are two more bent fingers 443 also kicked out from chassis 438. A wire spring 445 can now hold the shaft 415 of drum 400 in place on chassis 438 in cooperation with the bent fingers 442 and 443 by biasing shaft 415 against the two sides of the V of recesses 440*a* and 440*b*, thus making impossible any transverse movement of shaft 415.

On the side of chassis 438 in which the recess 440*b* is located there are also mounted plates 447 and 448 of fine tuning capacitance 62. Plate 447 consists of a metallic bent plate having an opening at one end 449 which be engaged by a screw 450 to secure bent plate 447 to chassis 438. Plate 447 is also provided with two extensions 446 kicked out from plate 447 and directed towards the chassis 438.

Plate 448 consists of a disc-shaped member 451 mounted on an annular insulation 452 which is secured to chassis 438 by means of a bracket 453 riveted to chassis 438. Annular insulation 452 serves to completely insulate disc 451 from chassis 438 since disc 451 represents the high voltage side of capacitance 62.

It is now evident that when the dielectric plate 431 is introduced between plates 447 and 448 and moved with respect to plate 447 and 448, the fine tuning variable capacitance 63 is obtained.

In order to make dielectric plate 131 bear against plate 447, a spring 445 is placed between dielectric plate 431 and chassis 438 to bias dielectric plate 431 against capacitance plate 447. Dielectric plate 431 is provided at one end with an extending finger 456 so that dielectric plate 431 may not be rotated by more than a certain previously established angle, the magnitude of this angle being determined by the positions of the two bent portions 446 of metallic plate 447.

The two chassis ends on which are located the recesses 440*a* and 440*b* are also provided with circular openings 460 to permit adjustments of the oscillator coils 33 and 120 as previously described.

On the other two sides of chassis 438 (see Figure 13) are secured a positioning device 465 and stationary contact structure 470, positioning device 465 and contact structure 470 being located in opposite sides of chassis 438. Positioning means 465 consists of a roller 471 pivoted on U-shaped extensions 472 of a spring 473 secured by means of screw 474 to chassis 438. Roller 471 engages the indentations 409 of central disc 402, thus positioning the whole drum 400 and its panels 410 with respect to chassis 438 or better with respect to the stationary contact structure 470.

Indentations 409 in disc 402 have a V-shaped end and it is against the sides of this V that 471 is biased by spring finger 473. In other words, roller 471 is biased by spring 473 against indentation 499 at points 474 and 475 so that disc 402 and, therefore, drum 400 will be firmly positioned by means of roller 471 in cooperation with V-shaped indentation 409. Stationary contact structure 470 (Figure 18) consists of two insulating supports 476 and 477. Support 476 is provided with six kidney spring contacts 480 which are riveted to insulating support 476. Insulating support 477 is provided with five kidney spring contacts 410 also riveted to insulating support 477. Insulating support 476 is provided with six kidney springs 480 which in turn each has an extension 483 providing a means for effecting a soldered connection. These extensions 482 and 483 serve to connect the terminals of the circuits mounted on the chassis to the circuits mounted on panels 410 on drum 400 which come in contact with kidney springs stationary contacts 480 and 210.

Aligned with support 476 which has six kidney spring contacts 480 are panels 217 for very high frequency or panels 350 (see Figure 18) for ultra-high frequencies which, as previously described, are the convertor oscillator segments of the tuner.

In correspondence with insulating support 477 having five kidney spring contacts 210 are panels 205 for very high frequencies and panels 250 (see Figure 18) for ultra-high frequencies. Panels 205 and panels 250 are, as previously described, the antenna segments of my novel tuner.

When roller 471 engages an indentation 409 in central disc 402 of drum 400, one pair of panels 205—217 for very high frequency channels or 250—350 for ultra-high frequency channels will be engaged by the stationary kidney spring contacts 210—480, thus connecting the circuits mounted on the panels 205 and 217 or 250 and 350 to the circuits mounted on the chassis 438 of my novel tuner.

For example, taking into consideration a very high frequency channel and its corresponding panels 217 and 205, when contacts 220 of panel 217 come into engagement with spring contacts 480 of support 476, oscillator coil 33 will be connected on one side through movable contact 220*a* and spring contact 480*a* to plate 45 of oscillator section 46 of double triode 39, while the other side of coil 33 will be connected through movable contact 220*b* and kidney spring contact 480*b* to capacitance 47 and thence to ground.

Coil 32 will be connected through movable contact 220*c* and kidney spring contact 480*c* to coupling capacitor 40 and thence to the grid 37 of convertor section 38 of double triode 39. The other side of coil 32 is connected through movable contact 220*d* and kidney spring contact 480*d* to ground. Coil 31 is connected through movable contact 220e and kidney spring 480e to plate 34 of tube 24 and the other side of coil 31 is connected through contacts 220f and kidney spring 480f to screen grid 35 of the R. F. tube 24.

Considering now the antenna segment 20 of my tuner, it is seen that when contacts 206 of panel 205 are in electrical contact with the five kidney spring contacts 210 mounted on insulating support 477, coil 21 is connected through movable contacts 205b and 206d and kidney spring contacts 210b and 210d to the 300 ohm antenna leads, while the center tap of coil 21 is connected through movable contact 206c and kidney spring contact 210c to ground.

Secondary coil 22 of antenna segment 20 is connected through movable contacts 206a and 206e and spring contacts 210a and 210e to the terminals of resistance 26 which, as previously described, is connected between grid 23 and cathode 25 of radio frequency amplifier tube 24.

Taking now into consideration a position of the drum in which a pair of ultra-high frequency panels 350 and 250 are positioned against the stationary insulating supports 476 and 477, it is seen that when contacts 351 of oscillator convertor segment 350 are engaged by kidney spring contacts 480 mounted on supports 476, coil 120 is connected through movable contacts 351a and 351b and kidney spring contacts 480a and 480b to the plate 45 of oscillator tube 46 and to capacitance 47, repectively.

Coil 122 is connected through movable contacts 351c and 351d and kidney springs 480c and 480d to capacitance 40 of convertor triode 38 and to ground, respectively, while coil 125 shunted by resistance 130 will be connected through movable contacts 351e and 351f and kidney spring contacts 480e and 480f to the plate 34 of R. F. amplifier 24 and to screen grid 35 of R. F. amplifier 24.

It is also to be noted that when the ultra-high frequency segments 250 and 350 are mounted on the drum 400 as shown in Figure 18, male connecting member 371 passes through slot 407 in central disc 402 to engage the female portion 311 of connector 100, thus completing the path from harmonic generator 95 through connecting member 371 to connecting member 311 to inductance 85 and from there to crystal mixer 60.

It is also seen from Figure 18 that when the ultra-high frequency antenna segment panel 250 is placed on drum 400 and secured there by means of spring fingers 418 in cooperation with slots 405 of disc 403 and slots 407 in disc 402, grounding connection 315 will bear against disc 402 which, being connected to the shaft 415, and through shaft 415 to the chassis 438, and also being connected through roller 471 to chassis 438, provides a good ground.

When contacts 255 of panel 250 come into engagement with kidney spring contacts 210 on insulating support 477, contacts 255b and 255d engage spring contacts 210b and 210d, thus connecting coil 71 to the 300 ohm antenna leads. Contact 255c will connect metallic sub-chassis 260 to ground through kidney spring contact 210c. Contact 255a when in engagement with kidney spring 210 will connect capacitance 102 to the grid 23 of radio frequency amplifier 24.

It is thus seen that when panel contacts 351 and 255 come into engagement with kidney spring contacts 480 and 210, the electrical circuit of the tuner is completed for the particular channel to which the tuner is switched.

To summarize the above, both the very high frequency antenna segments and the ultra-high frequency antenna segments have five outwardly extending terminals 206 (a–e) and 255 (a–e), respectively (see Figures 1 and 2), but the very high frequency circuit which comprises antenna segment 20 is quite different from the ultra-high frequency circuit which comprises antenna segment 55 as previously shown.

The same can be said in connection with the oscillator convertor segments 30 and 56 for very high frequencies and ultra-high frequencies, respectively. In their case, the panels 217 and 350 for very high frequency and ultra-high frequency, respectively, are provided with these outwardly extending contacts 220 (a–f) and 351 (a–f) respectively.

In this case too, the electrical circuits comprising segments 30 and 350 are also quite different. Aside from these differences, the rest of the electrical circuit of my tuning device, that is, the radio frequency amplifier tube, the oscillator convertor tube and the associated electrical components not enclosed by dotted lines in Figures 1 and 2 are mounted on the chassis 438 and are the same for both ultra-high frequency and very high frequency operation.

In other words, if an ultra-high frequency channel is desired by my tuning device, a very high frequency set of panels 205, 217 is removed from drum 400 and substituted in their place by the corresponding panels 250 and 350 for ultra-high frequency, this being the only change necessary to make my tuning device receptive to the desired ultra-high frequency signals.

When each ultra-high frequency will be assigned a channel number, these will be stamped or otherwise marked on panels 250, 350 so that they will leave the factory as a complete unit and not as parts to be later assembled in a complete unit.

To further illustrate the operation of my invention, the following circuit values have been employed in association with tube 6AG5 for tube 24 and 6J6 for tube 46:

| | |
|---|---|
| 26=3900 ohms | 52'=120 micromicrofarads |
| 29=47 kilo-ohms | 53=120 micromicrofarads |
| 36=10 kilo-ohms | 53'=10 micromicrofarads |
| 40=100 micromicrofarads | 54=2200 ohms |
| 42=4700 ohms | 54'=15 kilo-ohms |
| 43=220 kilo-ohms | 61=3–5 micromicrofarads |
| 47=10 micromicrofarads | 62=5–3 micromicrofarads |
| 50=10 kilo-ohms | 64=4700 ohms |
| 51=20 micromicrofarads | 78=.001 micromicrofarad |
| 52=5–3 micromicrofarads | |

In the foregoing I have described my invention solely in connection with specific illustrative embodiments thereof. Since many variations and modifications of my invention will now be obvious to those skilled in the art, I prefer to be bound not by the specific disclosures herein contained but only by the appended claims.

I claim:

1. A panel for removable mounting on a television tuner, said panel comprising an insulating support, a metallic sub-chassis fixedly mounted on said support, said sub-chassis and said panel having aligned openings, a dielectric cylinder mounted on said sub-chassis in alignment with said openings, coils mounted on said cylinder, a conductive tab fastened to a portion of the outer surface of said cylinder, a screw engaging said aligned openings in said sub-chassis, means for biasing threads of said screw against the inner surface of said sub-chassis openings and in spaced relation from the inner wall of said cylinder, said tab and said screw forming in conjunction with said portion of said dielectric cylinder a variable capacitor, and a conductive leaf spring secured to said sub-chassis and providing a grounding connection for said sub-chassis.

2. A panel for removable mounting on a television tuner, said panel comprising an insulating support, a metallic sub-chassis fixedly mounted on said support, said sub-chassis and said panel having aligned openings, a dielectric cylinder mounted on said sub-chassis in alignment with said openings, coils mounted on said cylinder, a conductive tab fastened to a portion of the outer surface of said cylinder, a screw engaging said aligned openings in said sub-chassis, said screw being a substantially homogeneous body, means for biasing threads of said screw against the inner surface of said sub-chassis openings and in spaced relation from the inner wall of said cylinder, and creating a good electrical contact between the elements and accurate position of the elements with respect to each other, said tab and said screw forming in conjunction with said portion of said dielectric cylinder a variable capacitor.

3. A panel for removable mounting on a television tuner, said panel comprising an insulating support, an angularly shaped metallic sub-chassis fixedly mounted on said support, one leg of said sub-chassis and said panel having aligned openings, a plurality of dielectric cylinders mounted on said sub-chassis, the long axis of each of said cylinders being in alignment with said openings, a coil mounted on each of said cylinders, a conductive tab fastened to a portion of the outer surface of each of said cylinders and connected to one end of said coil and forming therewith a tuned circuit, a grounding plate, the other end of said coil being connected to said grounding plate, a screw engaging said aligned opening in said sub-chassis, means comprising a wire spring for pressing said screw against the threads in said sub-chassis to ensure positive electric connection therebetween, said wire spring being arranged to bias said screws of adjacent coils in opposite direction and maintaining said coils in spaced relation from the inner wall of said cylinder, said tab and said screw forming in conjunction with said portion of said dielectric cylinder a variable capacitor, and a plastic film formed on the inner wall of said dielectric cylinder for preventing said screw from coming in direct contact with said dielectric material.

4. A panel for removable mounting on a television tuner, said panel comprising an insulating support, an angularly shaped metallic sub-chassis fixedly mounted on said support, one leg of said sub-chassis and said panel having aligned openings, a plurality of ceramic cylinders mounted on said sub-chassis, the long axis of each of said cylinders being in alignment with said openings, a coil mounted on each of said cylinders, a conductive tab fastened to a portion of the outer surface of each of said cylinders and connected to one end of said coil and forming therewith a tuned circuit, a grounding plate, the other end of said coil being connected to said grounding plate, a screw engaging said aligned opening in said sub-chassis, means comprising a wire spring for pressing said screw against the threads in said sub-chassis to ensure positive electric connection therebetween, said wire spring being arranged to bias said screws of adjacent coils in opposite direction and maintaining said coils in spaced relation from the inner wall of said cylinder, said tab and said screw forming in conjunction with said portion of said ceramic cylinder a variable capacitor, and a plastic film formed on the inner wall of said ceramic cylinder for preventing said screw from coming in direct contact with said ceramic material.

5. A panel for removable mounting on a television tuner, said panel comprising an insulating support, an angularly shaped metallic sub-chassis fixedly mounted on said support, one leg of said sub-chassis and said panel having aligned openings, a dielectric cylinder mounted on said sub-chassis, the long axis of said cylinder being in alignment with said openings, a coil mounted on said cylinder, a conductive tab fastened to a portion of the outer surface of said cylinder and connected to one end of said coil and forming therewith a tuned circuit, a grounding plate, the other end of said coil being connected to said grounding plate, a screw engaging said aligned opening in said sub-chassis, means for biasing the threads of said screw against the inner surface of said sub-chassis opening and in spaced relation from the inner wall of said cylinder, said tab and said screw forming in conjunction with said portion of said dielectric cylinder a variable capacitor, said tab being connected to one end of said coil, and a plastic film formed on the inner wall of said dielectric cylinder for preventing said screw from coming in direct contact with said dielectric material.

6. A panel for removable mounting on a television tuner, said panel comprising an insulating support, an angularly shaped metallic sub-chassis fixedly mounted on said support, one leg of said sub-chassis and said panel having aligned openings, a dielectric cylinder mounted on said sub-chassis, the long axis of said cylinder being in alignment with said openings, a coil mounted on said cylinder, a conductive tab fastened to a portion of the outer surface of said cylinder and connected to one end of said coil and forming therewith a tuned circuit, a screw engaging said aligned opening in said sub-chassis, means for biasing the threads of said screw against the inner surface of said sub-chassis opening and in spaced relation from the inner wall of said cylinder, said tab and said screw forming in conjunction with said portion of said dielectric cylinder a variable capacitor, said tab being connected to one end of said coil, and a plastic film formed on the inner wall of said dielectric cylinder for preventing said screw from coming in direct contact with said dielectric material.

7. A panel for removable mounting on a television tuner, said panel comprising an insulating support, an angularly shaped metallic sub-chassis fixedly mounted on said support, one leg of said sub-chassis and said panel having aligned openings, a dielectric cylinder mounted on said sub-chassis, the long axis of said cylinder being in alignment with said openings, a coil mounted on said cylinder, a conductive tab fastened to a portion of the outer surface of said cylinder and connected to one end of said coil and forming therewith a tuned circuit, a grounding plate, the other end of said coil being connected to said grounding plate, a screw engaging said aligned opening in said sub-chassis, means for biasing the threads of said screw against the inner surface of said sub-chassis opening and in spaced relation from the inner wall of said cylinder, said tab and said screw forming in conjunction with said portion of said dielectric cylinder a variable capacitor, said tab being connected to one end of said coil.

8. A U. H. F. tuning element comprising an insulating tube, a coil wound on said tube, a homogeneous movable conductive insert in said insulating tube, said insert being threaded substantially along its complete length, and a metallic tab rigidly attached to the external surface of said tube forming a capacitor with said conductive insert and forming one terminal of said coil, said insert being threaded in a second terminal and biasing means for biasing said insert into high pressure electrical engagement with said second terminal, the capacitance of said capacitor being varied between predetermined limits by the movement of said insert, and a plastic film formed on the inner wall of said insulating tube for preventing said screw from coming in direct contact with said tube material, said coil and said capacitor forming a U. H. F. tuned circuit.

References Cited in the file of this patent

UNITED STATES PATENTS

| | | |
|---|---|---|
| 920,374 | McDonald | May 4, 1909 |
| 2,394,391 | Martowicz | Feb. 5, 1946 |
| 2,496,183 | Thias et al. | Jan. 31, 1950 |
| 2,618,749 | Altenberger | Nov. 18, 1952 |
| 2,622,203 | Kiebert et al. | Dec. 16, 1952 |
| 2,657,365 | Lazzery | Oct. 27, 1953 |
| 2,669,700 | Rauch | Feb. 16, 1954 |